US008798355B2

(12) United States Patent
Mori

(10) Patent No.: US 8,798,355 B2
(45) Date of Patent: Aug. 5, 2014

(54) AUTHENTICITY DETERMINATION SUPPORT DEVICE, AUTHENTICITY DETERMINATION DEVICE, COMPUTER READABLE MEDIUM, AND AUTHENTICITY DETERMINATION SUPPORT METHOD

(75) Inventor: Taro Mori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 338 days.

(21) Appl. No.: 13/287,300

(22) Filed: Nov. 2, 2011

(65) Prior Publication Data

US 2013/0004055 A1 Jan. 3, 2013

(30) Foreign Application Priority Data

Jun. 30, 2011 (JP) ................................. 2011-146408

(51) Int. Cl.
*G06K 9/36* (2006.01)
*H04N 7/26* (2006.01)
*B42D 15/00* (2006.01)

(52) U.S. Cl.
USPC ......... 382/141; 382/232; 375/E7.026; 283/72

(58) Field of Classification Search
CPC ............................... G07D 7/2033; G07D 7/20
USPC ......... 382/232, 233, 100, 115, 124, 125, 243, 382/276, 285, 181, 190, 141; 283/70, 72, 283/81, 109; 375/E7.001, E7.026, E7.083, 375/E7.209, 7.026
See application file for complete search history.

(56) References Cited

U.S. PATENT DOCUMENTS 6,760,472 B1 * 7/2004 Takeda et al. ................. 382/149
7,630,559 B2 * 12/2009 Ito et al. ......................... 382/209
2011/0150342 A1 * 6/2011 Franken et al. ............... 382/190

FOREIGN PATENT DOCUMENTS

JP 2005-038389 A 2/2005
JP 2010-246034 A 10/2010

* cited by examiner

*Primary Examiner* — Sheela Chawan
(74) *Attorney, Agent, or Firm* — Sughrue Mion, PLLC

(57) ABSTRACT

An authenticity determination support device includes an acquiring unit and a compressing unit. The acquiring unit photographs, in a solid having a unique random feature in a surface thereof, a predetermined area in the surface such that continuity of the feature is generated in a predetermined direction, and thereby acquires feature information representing the feature included in the area. The compressing unit compresses the feature information in a direction in which continuity of the feature information acquired by the acquiring unit is high.

13 Claims, 9 Drawing Sheets

AUTHENTICITY DETERMINATION SUPPORT DEVICE, AUTHENTICITY DETERMINATION DEVICE, COMPUTER READABLE MEDIUM, AND AUTHENTICITY DETERMINATION SUPPORT METHOD

CROSS-REFERENCE TO RELATED APPLICATIONS

This application is based on and claims priority under 35 USC 119 from Japanese Patent Application No. 2011-146408 filed Jun. 30, 2011.

BACKGROUND

Technical Field

The present invention relates to an authenticity determination support device, an authenticity determination device, a computer readable medium, and an authenticity determination support method.

SUMMARY

According to an aspect of the invention, there is provided an authenticity determination support device including an acquiring unit and a compressing unit. The acquiring unit photographs, in a solid having a unique random feature in a surface thereof, a predetermined area in the surface such that continuity of the feature is generated in a predetermined direction, and thereby acquires feature information representing the feature included in the area. The compressing unit compresses the feature information in a direction in which continuity of the feature information acquired by the acquiring unit is high.

BRIEF DESCRIPTION OF THE DRAWINGS

Exemplary embodiments of the present invention will be described in detail based on the following figures, wherein.

DETAILED DESCRIPTION

Figure 1:
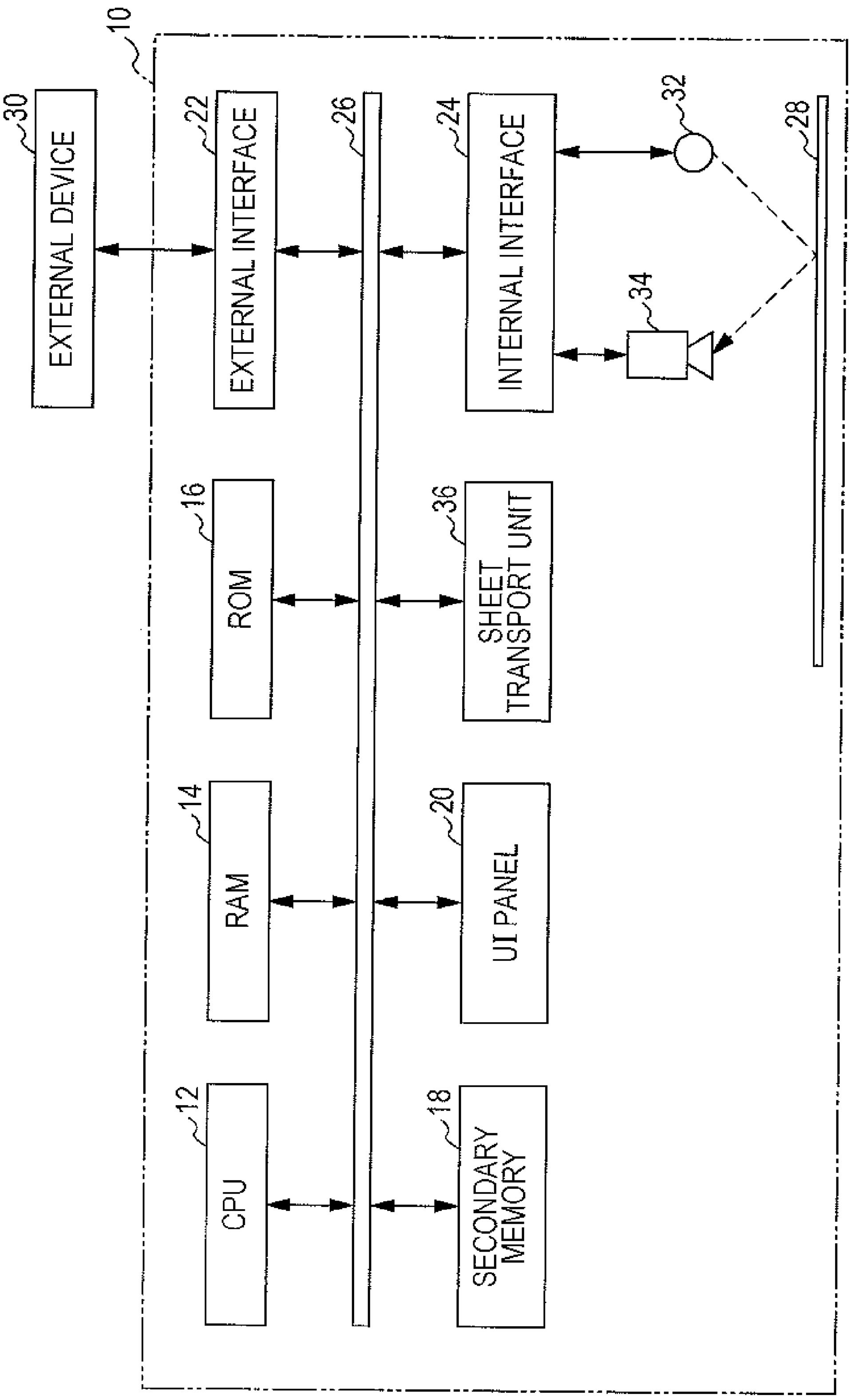
FIG. 1 is a schematic configuration diagram illustrating an example of a configuration of an authenticity determination device according to an exemplary embodiment.

An example of an exemplary embodiment for implementing the invention will be described in detail below with reference to the drawings.

Random Pattern: Prior to the description of the present exemplary embodiment, description will be first made of a random feature originally possessed by a solid article, i.e., a non-reproducible feature of minute irregularities (hereinafter referred to as “random pattern”).

For example, nonwoven fabric is formed by complicatedly entangling fiber, and a pattern formed by the fiber is one and only unique entity. That is, a random pattern formed by fiber is observed in nonwoven fabric. Further, paper is also formed by complicatedly entangling plant fiber. Therefore, a random pattern unique to each paper is also observed in paper similarly as in nonwoven fabric.

Further, also in a carbon-filled black rubber surface, a ceramic surface for an integrated circuit (IC) package, or a surface of a coating of an ultraviolet (UV) curing paint dispersed with metal particulates (so-called lame coating), a random pattern is observed owing to, for example, minute cracks in the surface or particulates of the material. Further, also in a stainless steel surface, a random pattern is observed which is formed in surface finishing, such as hairline treatment and sandblasting treatment. Further, also in leather in a natural state, random creases are formed in a surface thereof, and thus are observed as a random pattern.

As described above, the random pattern is observed in a variety of articles. The random pattern is not intentionally produced, but is generated at random during the formation or manufacturing process of the articles or after the manufacturing of the articles. It is therefore difficult to presume the existence of multiple articles exactly the same in the pattern. Further, it is considered difficult to intentionally produce the same pattern. That is, even if articles are manufactured and distributed through the same process, the articles have microscopically different random patterns. In particular, the random pattern as described above is a minute pattern on a microscopic level. Therefore, it is not easy to forge the pattern. Further, the random pattern of a rubber surface, a leather surface, or a soft material having a changeable shape, such as nonwoven fabric, is stable, unless applied with external force.

According to the present exemplary embodiment, the random pattern originally possessed by the articles as described above is used as information for determining the authenticity of articles. Some methods, such as a stylus method and an electron microscope observation method, are conceivable to read such a minute random pattern. In view of preservation of articles, it is desirable that the methods neither process nor destroy the articles. In this regard, a method using light is superior. Description will be made below of an authenticity determination device which determines the authenticity of an article by reading the random pattern with the use of light.

Overall Configuration: FIG. 1 is a schematic configuration diagram of an authenticity determination device 10 according to the present exemplary embodiment. As illustrated in FIG. 1, the authenticity determination device 10 includes a central processing unit (CPU) 12, a random access memory (RAM) 14, a read-only memory (ROM) 16, a secondary memory 18, a user interface (UI) panel 20, an external interface (I/F) 22, an internal I/F 24, a light source 32, a camera 34, and a sheet transport unit 36.

The CPU 12 executes programs stored in the ROM 16, and controls the overall operation of the authenticity determination device 10. The programs stored in the ROM 16 include a master data registration process program and an authenticity determination process program. The master data registration process program photographs, as a subject, a predetermined area including a random pattern of a surface of an article serving as a registration target, extracts, from an image obtained by the photographing, a feature image serving as feature information representing the feature of the random pattern of the surface of the article, and registers the feature image as a part of master data relating to a reference target article to be used in the determination of authenticity. The authenticity determination process program photographs a surface of an article serving as a target of authenticity determination, extracts, from an image obtained by the photographing, a feature image serving as feature information representing the feature of a random pattern of the surface of the article, and compares the feature image, as sample data, with the feature image included in the previously registered master data, to thereby determine the authenticity of the article.

Herein, the random pattern of a surface of an article refers to a non-reproducible minute feature of an externally photographed article. For example, in the case of an article having an exterior covered by a transparent protection film allowing a minute feature of a layer disposed under the protection film to be photographed, the random pattern includes both a non-reproducible minute feature appearing in the transparent protection film and a non-reproducible minute feature appearing in the layer under the transparent protection film. Specific examples include cards currently widely used in financial institutions and so forth, such as a cash card and a credit card. Such cards include, for example, a type of card having a transparent layer, such as a hard coating, adhering to a coating in which a minute lame-like base pattern appears. In the case of such an article, therefore, the random pattern includes both the minute random pattern of, for example, irregularities appearing in the protection film and the minute base pattern (random pattern) in the layer under the protection film.

In the present exemplary embodiment, description will be made with a sheet 28 taken as an example of the article serving as the authenticity determination target. The article, however, is not limited thereto. For example, the article may be any solid circulated as an article such as a magnetic card (hereinafter referred to as "card") having a tape-like (stripe) magnetic recording medium adhering to a plastic card, such as a cash card and a credit card.

The RAM 14 serves as a working memory, and includes an area for temporarily storing, for example, a photographed image and a feature image extracted from the photographed image. The secondary memory 18 stores a variety of information required to be held even if a power switch of the device is turned off. For example, a hard disk device and a flash memory are applied as the secondary memory 18. The UI panel 20 is formed by, for example, a touch panel display having a transmissive touch panel superimposed on a display. The UI panel 20 displays a variety of information on a display screen of the display, and receives a variety of information and instructions in accordance with a touch on the touch panel by a user.

The CPU 12, the RAM 14, the ROM 16, the secondary memory 18, and the UI panel 20 are connected to one another via a system bus 26. Therefore, the CPU 12 accesses the RAM 14, the ROM 16, and the secondary memory 18, displays a variety of information on the UI panel 20, and grasps the contents of an operation instruction from the user input to the UI panel 20.

The external I/F 22 is connected to an external device 30, and serves as an interface for transmitting and receiving data to and from the external device 30. The external I/F 22 is also connected to the system bus 26. Therefore, the CPU 12 transmits the feature image of the sheet 28 to the external device 30 via the external I/F 22 to register the feature image of the sheet 28 in the external device 30, and receives the registered feature image of the sheet 28 from the external device 30 via the external I/F 22 to use the feature image of the sheet 28 in the authenticity determination device 10.

The internal I/F 24 is connected to the light source 32 and the camera 34, and serves as an interface for transmitting and receiving data to and from the light source 32 and the camera 34. The light source 32 radiates light of a predetermined wavelength range, and is disposed to illuminate a surface of the sheet 28 placed at a predetermined position by radiating the light in a direction oblique to the surface of the sheet 28. A light-emitting diode (LED), a halogen lamp, a fluorescent lamp, or a xenon discharge tube, for example, is applied as the light source 32. The camera 34 acquires an image by photographing, as a subject, a predetermined area in the surface of the sheet 28 illuminated with the light radiated from the light source 32. The position and direction of the camera 34 in the authenticity determination device 10 are fixed.

The internal I/F 24 is also connected to the system bus 26. Therefore, the CPU 12 controls the lighting timing (light irradiation timing) of the light source 32 via the internal I/F 24, grasps the lighting state of the light source 32, controls the photographing timing of the camera 34 via the internal I/F 24, and acquires the image obtained through the photographing by the camera 34.

The sheet transport unit 36 transports the sheet 28 to a predetermined position (hereinafter referred to as "photographing position") such that a predetermined area in the sheet 28 is photographed by the camera 34 in a predetermined direction. The sheet transport unit 36 is also connected to the system bus 26. Therefore, the CPU 12 controls the sheet transport unit 36, and grasps the operational state of the sheet transport unit 36.

Figure 2:
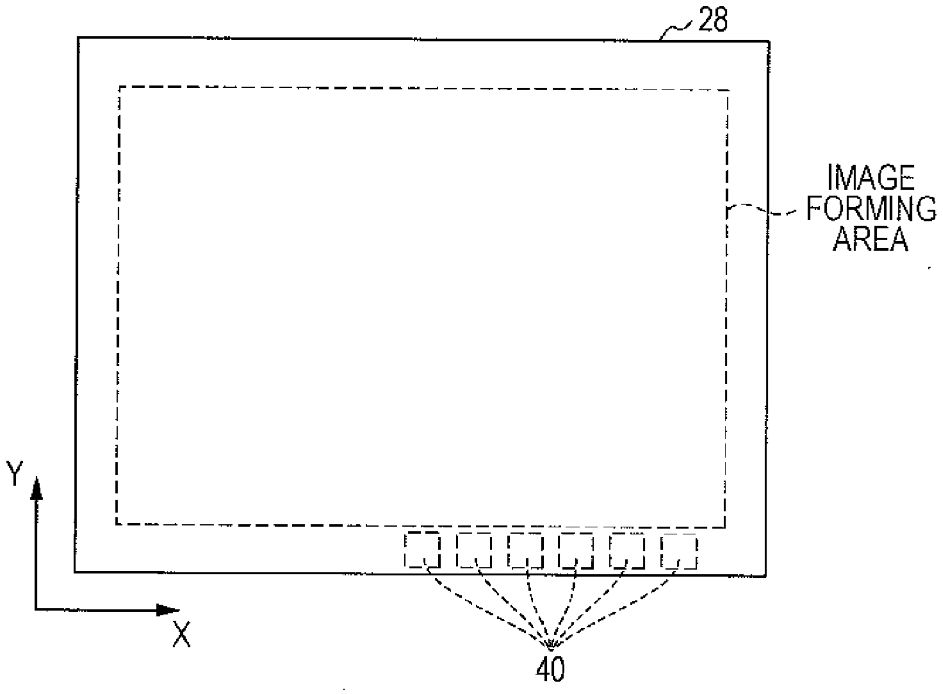
FIG. 2 is a schematic configuration diagram illustrating an example of a configuration of a sheet serving as a target of authenticity determination using the authenticity determination device according to the exemplary embodiment.

FIG. 2 illustrates an example of embodiment of the sheet 28 serving as the target of authenticity determination by the authenticity determination device 10 according to the present exemplary embodiment. As illustrated in FIG. 2, the sheet 28 has a substantially rectangular shape. In a central portion of the sheet 28, a substantially rectangular image forming area is provided which is offset inward from the outline of the sheet 28 by a predetermined distance (about 5 mm, for example), and in which an image is formed by, for example, a printer. Further, when the longer direction and the shorter direction of the sheet 28 are represented as the X direction and the Y direction, respectively, plural (herein six, for example) predetermined areas 40 each photographed by the camera 34 are provided along the X direction in a margin between a longer side of the sheet 28 and a side of the image forming area adjacent to the longer side. In the example illustrated in FIG. 2, the image forming area and the predetermined areas 40 are drawn with broken lines for convenience of explanation. However, such broken lines are not drawn on the actual sheet 28.

Figure 3A:
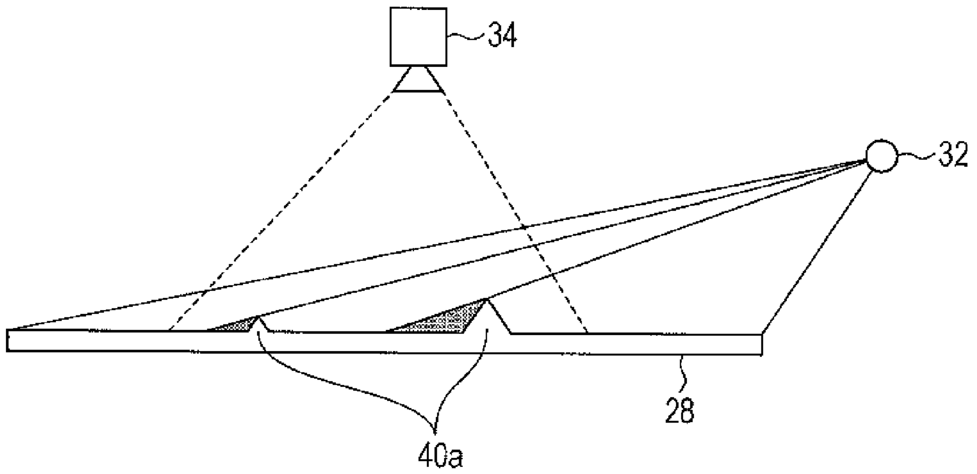
FIGS. 3A and 3B are schematic diagrams illustrating an example of a state in which a predetermined area is being photographed by a camera with light radiated to the predetermined area in a surface of the sheet by a light source, FIG. 3A illustrating a state of the predetermined area as viewed from a lateral side, and FIG. 3B illustrating a state of the predetermined area as viewed from above.
Figure 3B:
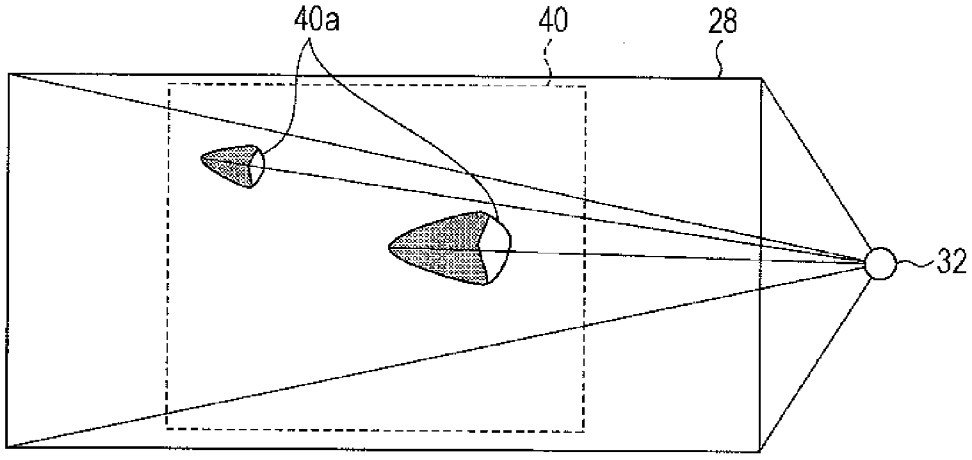

FIGS. 3A and 3B illustrate an example of a state in which a predetermined area 40 is being photographed by the camera 34 with light radiated to the predetermined area 40 in a surface of the sheet 28 by the light source 32. In the example illustrated in FIGS. 3A and 3B, the camera 34 is disposed above the predetermined area 40 such that the predetermined area 40 in the sheet 28 placed at the photographing position is set as a subject. Further, the light source 32 is disposed to illuminate the predetermined area 40 at a predetermined angle of inclination relative to a flat region of the predetermined area 40 in the surface of the sheet 28. The light source 32 emits light of a predetermined wavelength range. When the light emitted from the light source 32 falls on convex portions 40*a* of a minute irregular pattern forming a random pattern included in the predetermined area 40, the shadows of the convex portions 40*a* are formed. The camera 34 photographs the predetermined area 40 having the random pattern including the shadows of the convex portions 40*a*. In the present exemplary embodiment, description has been made with reference to an example of embodiment in which the light is radiated from obliquely above at an angle of about 30 degrees relative to the flat region of the predetermined area 40 such that the shadows of the convex portions 40*a* are formed. The configuration, however, is not limited thereto. The light source 32 may be disposed at any position allowing the light source 32 to radiate the light such that the shadows of the convex portions 40*a* are formed.

Operation of Authenticity Determination Device: Subsequently, the operation of the authenticity determination device 10 will be described. To determine the authenticity of a sheet 28, it is necessary to previously register the feature of the random pattern possessed by a sheet 28 regarded as authentic. With reference to FIGS. 4 to 9, therefore, description will be first made of the master data registration process executed in the authenticity determination device 10. The master data registration process is achieved when the master data registration process program stored in the ROM 16 is executed by the CPU 12.

Figure 4:
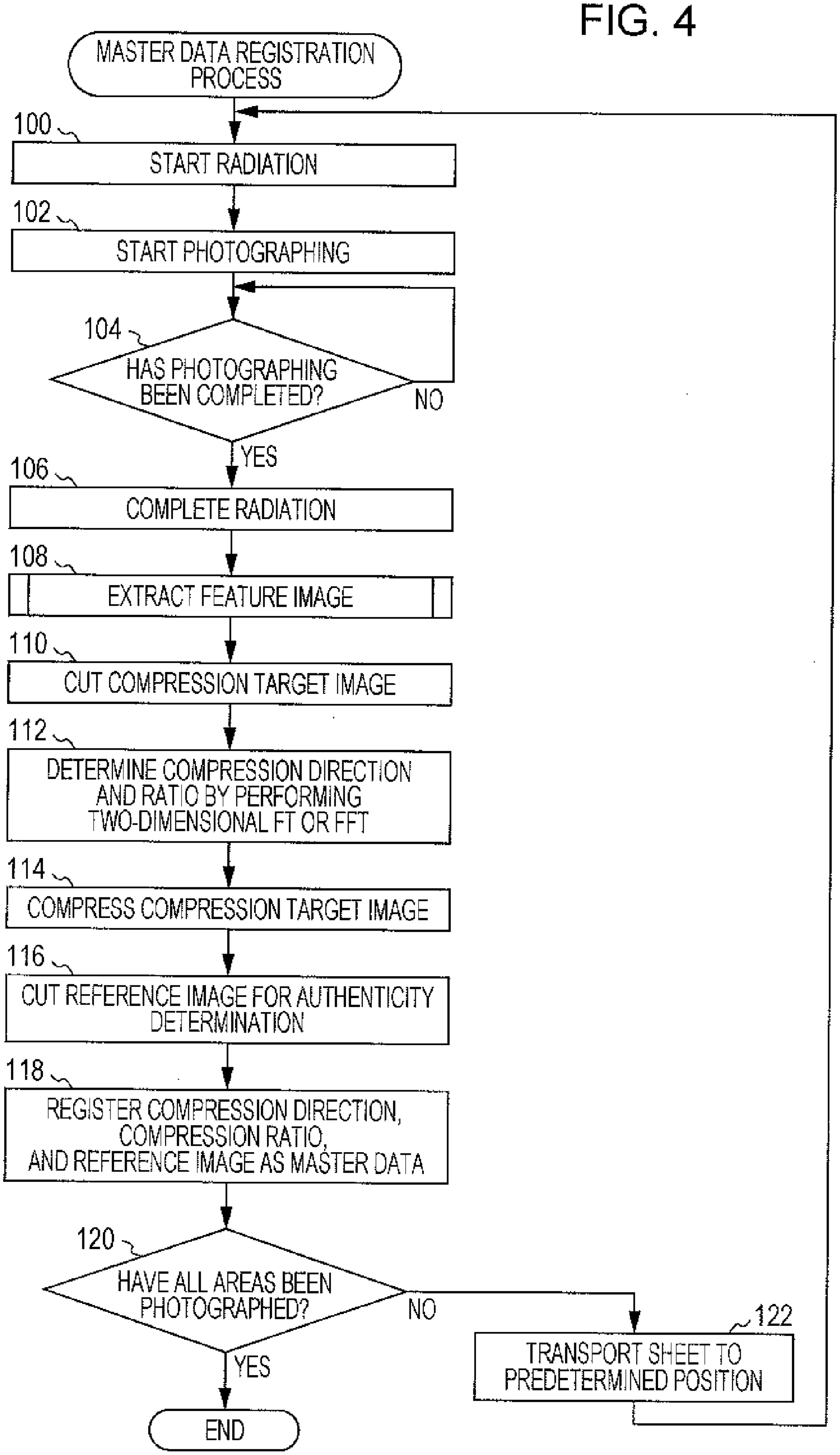
FIG. 4 is a flowchart illustrating an example of a flow of processing of a master data registration process program according to an exemplary embodiment.

FIG. 4 is a flowchart illustrating an example of a flow of processing of the master data registration process program according to the present exemplary embodiment. To avoid complexity, the following description will be made of a case where a sheet 28 to be compared with a sheet 28 serving as a target of authenticity determination (sheet 28 serving as a reference for authenticity determination) is placed at the photographing position.

At Step 100 in FIG. 4, the CPU 12 instructs the light source 32 to start radiating light to a predetermined area 40, and the procedure proceeds to Step 102. In accordance with the process of the above-described Step 100, the light source 32 starts radiating light to the predetermined area 40. At Step 102, the CPU 12 instructs the camera 34 to start photographing, and the procedure proceeds to Step 104. In accordance with the process of the above-described Step 102, the camera 34 starts photographing the predetermined area 40 as a subject. It is assumed herein that an image is photographed with a resolution of about 400 dots per inch (dpi), for example. At Step 104, the CPU 12 stands by until the photographing of the predetermined area 40 completes. If the image is acquired through the photographing of the predetermined area 40 by the camera 34, a positive determination is made at Step 104. Then, the procedure proceeds to Step 106. At Step 106, the CPU 12 instructs the light source 32 to complete the radiation of light to the predetermined area 40, and the procedure proceeds to Step 108. In accordance with the process of the above-described Step 106, the light source 32 completes the radiation of light to the predetermined area 40.

Figure 5:
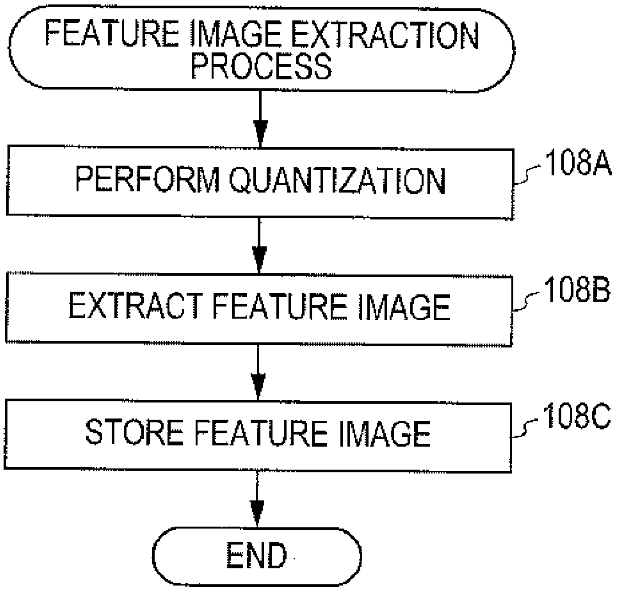
FIG. 5 is a flowchart illustrating an example of a flow of processing of a feature image extraction process program according to an exemplary embodiment.

At Step 108, a feature image extraction process is executed. Herein, with reference to FIG. 5, description will be made of an operation of the authenticity determination device 10 performed during the execution of the feature image extraction process. FIG. 5 is a flowchart illustrating an example of a flow of processing of a feature image extraction process program executed by the CPU 12. The feature image extraction process program is previously stored in the ROM 16.

At Step 108A in FIG. 5, quantization is performed on the image acquired by the camera 34 through the processes of the above-described Steps 102 and 104. That is, the image obtained by the photographing is divided into meshes of a predetermined number of pixels (mesh number d=vertical number M×horizontal number N, for example), to thereby perform quantization. Then, at Step 108B, each of the meshes is represented by a certain density value (density level q) to perform sampling, and thereby a feature image is extracted.

In the present exemplary embodiment, the feature image obtained by sampling is described in matrix form at the above-described Step 108B. The configuration, however, is not limited thereto. With the density of the j-th mesh represented as $X_j$, the random pattern of the feature image may be described by a feature vector $X=(X_1, X_2, \ldots X_d)^t$ (wherein t represents transposition). In this case, the feature vector is used as information representing the feature image. The elements of the feature vector provide densities to the respective corresponding pixels. Therefore, the random pattern of the feature image is expressed as one point in a feature space spanned by the feature vector. As described above, sheets 28 have microscopically different random patterns. Therefore, the feature vector represents a unique feature for each of the sheets 28. That is, the feature of the random pattern of each sheet 28 is expressed by the feature vector.

At the next Step 108C, the feature image obtained by the process of the above-described Step 108B is stored in a predetermined storage area α of the RAM 14. Thereafter, the present feature image extraction process program is completed, and the procedure proceeds to Step 110 of the master data registration process program.

Figure 6:
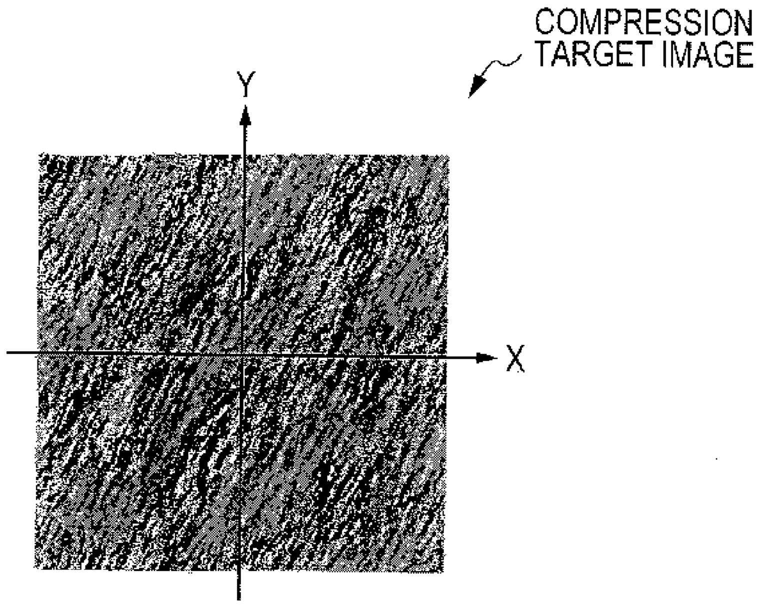
FIG. 6 is a diagram illustrating an example of a compression target image.
Figure 7:
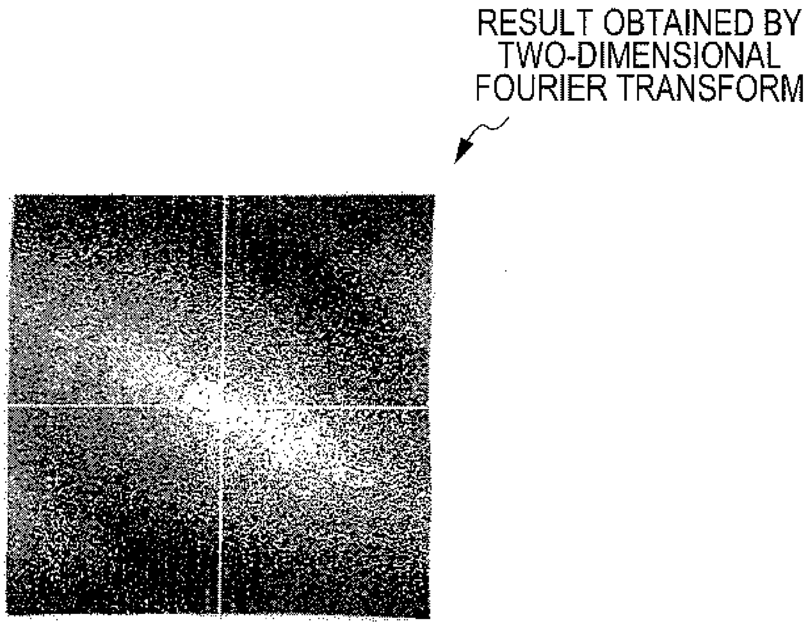
FIG. 7 is a diagram illustrating a result obtained by two-dimensional Fourier transform performed on the compression target image illustrated in FIG. 6.
Figure 8:
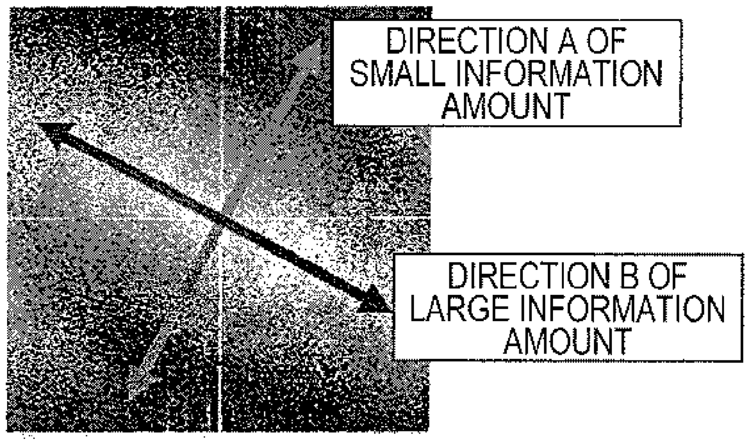
FIG. 8 is a diagram illustrating anisotropy of an information amount.
Figure 9:
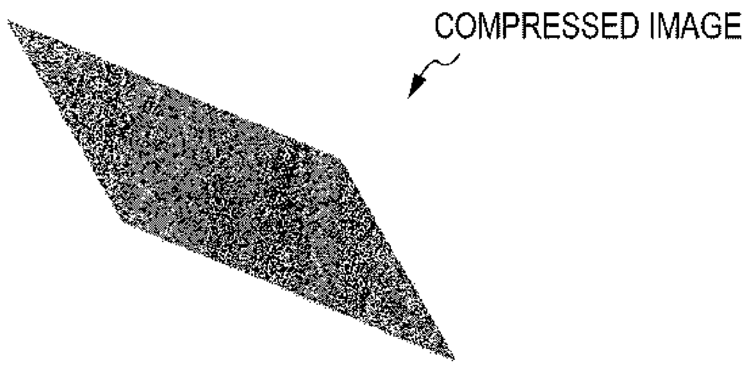
FIG. 9 is a diagram illustrating an example of an image obtained by compression of the compression target image (compressed image)

At Step 110, the feature image is read from the predetermined storage area α of the RAM 14, and a compression target image is cut from the read feature image. At the next Step 112, a result obtained by two-dimensional Fourier transform (FT) or two-dimensional fast Fourier transform (FFT) performed on the compression target image cut in the process of the above-described Step 110 is analyzed to determine the compression direction and the compression ratio of the compression target image. That is, at Step 112, the result obtained by the two-dimensional FT or FFT performed on the compression target image cut in the process of the above-described Step 110 is analyzed to identify a direction of high continuity of information and a direction of low continuity of information. Further, the direction of low continuity is determined as the compression direction of the feature image, and the compression ratio is determined such that the continuity in the direction of low continuity approaches the continuity in the direction of high continuity. For example, if the compression target image cut in the process of the above-described Step 110 has a substantially rectangular shape and is defined by a two-dimensional coordinate system, as illustrated in FIG. 6, the compression target image subjected to the two-dimensional FT or FFT is illustrated as in FIG. 7, for example. In this case, the direction of low continuity of information (direction A of a small information amount) and the direction of high continuity of information (direction B of a large information amount) are identified, as illustrated in FIG. 8, for example. Then, the direction A of low continuity is determined as the compression direction of the feature image. The compression ratio is determined such that the continuity of information in the direction A of a small information amount approaches the continuity of information in the direction B of a large information amount. The present exemplary embodiment employs the compression ratio with which the continuity of information in the direction A of a small information amount is most approximate to the continuity of information in the direction B of a large information amount (compression ratio with which the continuities of information match within a predetermined error range). The compression ratio, however, is not limited thereto, and a compression ratio may be employed with which the anisotropy relating to the continuity of the information amount in the result of the two-dimensional FT or FFT performed on the compression target image is reduced to be at least lower than the anisotropy at the present moment.

At the next Step 114, the compression target image cut in the process of the above-described Step 110 is compressed in the compression direction determined in the process of the above-described Step 112 with the compression ratio determined in the process of the above-described Step 112 (linear-transformed with the use of a transformation matrix of predetermined fixed values). Thereafter, the procedure proceeds to Step 116. If the compression target image illustrated in FIG. 6, for example, is compressed in the direction A of a small information amount illustrated in FIG. 8 by the process of the above-described Step 114, the image illustrated in FIG. 9, for example, is obtained.

Figure 10:
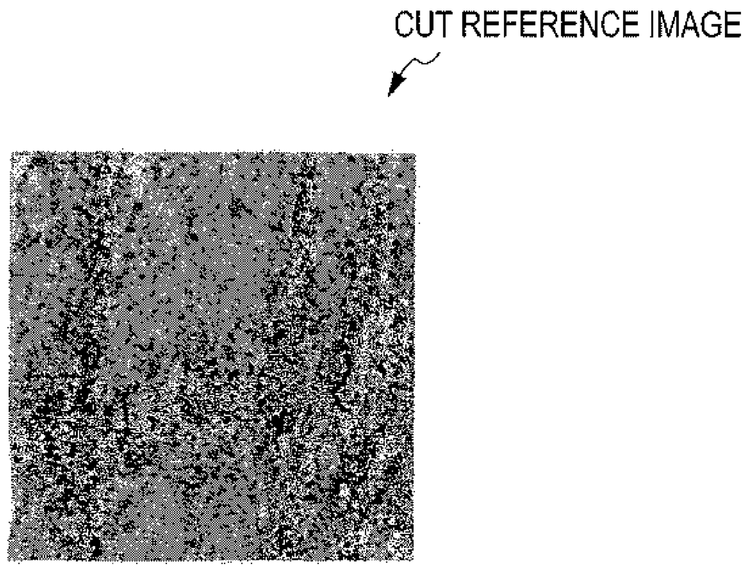
FIG. 10 is a diagram illustrating an example of a reference image used in authenticity determination.

At Step 116, a reference image for authenticity determination is cut from the compressed image obtained by the compression in the process of the above-described Step 114. Thereafter, the procedure proceeds to Step 118. An example of the reference image cut in the process of the above-described Step 116 is illustrated in FIG. 10. As illustrated in FIG. 10, it is observed that the compression of the compression target image in the process of the above-described Step 114 results in a reduction in anisotropy of the direction relating to the continuity of the information amount (unevenness of the information density). That is, it is observed that a substantially streamline pattern, in which the shape of fiber forming the sheet 28 flows from the lower-left side toward the upper-right side, appears in the compression target image illustrated in FIG. 6 (image prior to the compression), while such a substantially streamline pattern flowing in a specific direction is difficult to find in the reference image illustrated in FIG. 10.

At Step 118, information associating the compression direction and the compression ratio determined in the process of the above-described Step 112 and the reference image cut in the process of the above-described Step 116 with one another is stored as master data in the secondary memory 18 for each of the predetermined areas 40, and thereby is registered. Thereafter, the procedure proceeds to Step 120.

At Step 120, it is determined whether or not all of the predetermined areas 40 (six predetermined areas 40 in the present exemplary embodiment) have been photographed. If the determination is negative, the procedure proceeds to Step 122, and the CPU 12 controls the sheet transport unit 36 to transport the sheet 28 to the photographing position at which an unphotographed predetermined area 40 is to be photographed. Thereafter, the procedure returns to Step 100. If the determination is positive at Step 120, the present master data registration process is completed.

Figure 11:
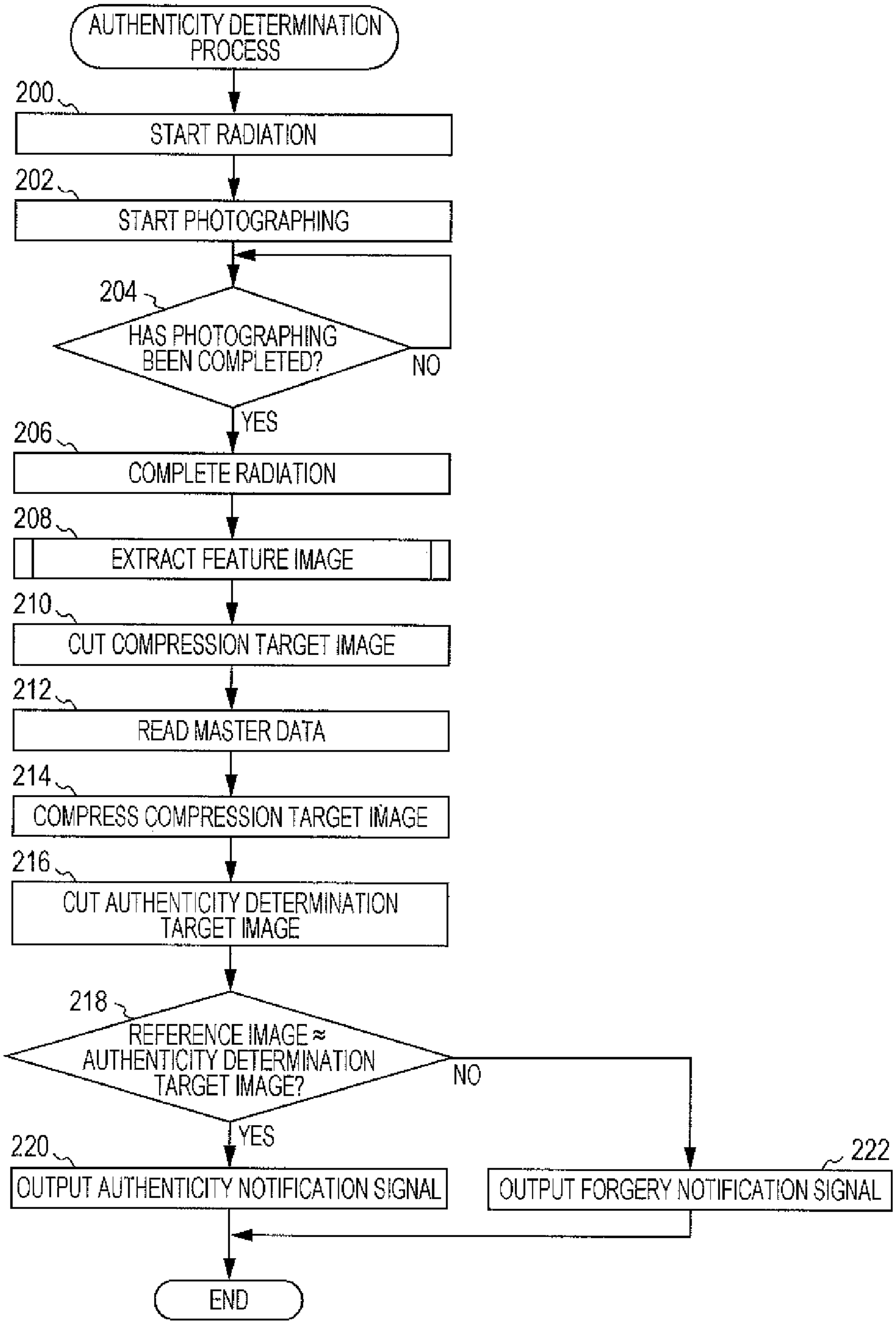
FIG. 11 is a flowchart illustrating an example of a flow of processing of an authenticity determination process program according to an exemplary embodiment.

Subsequently, an operation of determining the authenticity of the sheet 28 will be described with reference to FIG. 11. In the authenticity determination device 10 according to the present exemplary embodiment, the CPU 12 executes the authenticity determination process program when determining the authenticity of the sheet 28. FIG. 11 is a flowchart illustrating an example a flow of processing of the authenticity determination process program according to the present exemplary embodiment. To avoid complexity, the following description will be made of a case where the sheet 28 serving as the target of authenticity determination is placed at the photographing position.

At Step 200 in FIG. 11, a process corresponding to the process of the above-described Step 100 is executed. Thereafter, the procedure proceeds to Step 202. At Step 202, a process corresponding to the process of the above-described Step 102 is executed. Thereafter, the procedure proceeds to Step 204. At Step 204, a process corresponding to the process of the above-described Step 104 is executed. Thereafter, the procedure proceeds to Step 206. At Step 206, a process corresponding to the process of the above-described Step 106 is executed. Thereafter, the procedure proceeds to Step 208. At Step 208, a process corresponding to the process of the above-described Step 108 is executed. Thereafter, the procedure proceeds to Step 210. At the above-described Step 208, the process of the flowchart illustrated in FIG. 5 is executed. In this case, the feature image of the predetermined area 40 in the sheet 28 serving as the target of authenticity determination is extracted as sample data at Step 108B.

At Step 210, the sample data is read from the predetermined storage area $\alpha$ of the RAM 14, and a compression target image is cut from the read sample data. Thereafter, the procedure proceeds to Step 212. At Step 212, the master data is read from the secondary memory 18. Thereafter, the procedure proceeds to Step 214. At Step 214, the compression target image cut in the process of the above-described Step 210 is compressed in the compression direction included in the master data read in the process of the above-described Step 212 with the compression ratio included in the master data read in the process of the above-described Step 212. Thereafter, the procedure proceeds to Step 216. At Step 216, an authenticity determination target image is cut from the compressed image obtained by the compression in the process of the above-described Step 214. Thereafter, the procedure proceeds to Step 218. The shape and size of the cut image correspond to the shape and size of the outline of the reference image included in the master data read in the process of the above-described Step 212.

At Step 218, it is determined whether or not a relationship of "the reference image included in the master data read in the process of the above-described Step 212" ≈ "the authenticity determination target image cut in the process of the above-described Step 216" is established. If the determination is positive, the procedure proceeds to Step 220. Meanwhile, if the determination is negative, the procedure proceeds to Step 222.

At Step 220, an authenticity notification signal is output which indicates that the sheet 28 serving as the target of authenticity determination is authentic. Thereafter, the present authenticity determination process program is completed. At Step 222, a forgery notification signal is output which indicates that the sheet 28 serving as the target of authenticity determination is a forgery. Thereafter, the present authenticity determination process program is completed.

In the present exemplary embodiment, the UI panel 20 is set as both the output destination of the authenticity notification signal output in the process of the above-described Step 220 and the output destination of the forgery notification signal output in the process of the above-described Step 222.

The UI panel 20 according to the present exemplary embodiment receives the authenticity notification signal output in the process of the above-described Step 220, and displays, for example, a message indicating that the sheet 28 is authentic ("The sheet is authentic," for example). Further, the UI panel 20 receives the forgery notification signal output in the process of the above-described Step 222, and displays, for example, a message indicating that the sheet 28 is a forgery ("The sheet is a forgery," for example). This embodiment of display is an example, and another embodiment of display may be employed. For example, the result of authenticity determination may be audibly displayed with sound from a speaker, or may be printed on a sheet by a printer to be permanently visibly displayed. Further, at least two embodiments of display selected from the visible display by the UI panel 20, the audible display by a speaker, and the permanent visible display by a printer may be combined. Further, the configuration is not limited to the exemplary embodiment which displays the result of authenticity determination as readable text information. The result of authenticity determination may be output after being encrypted and converted into an image, such as a bar code and a quick response (QR) code. Further, the external device 30 may be set as the output destination of the authenticity notification signal output in the process of the above-described Step 220 and the output destination of the forgery notification signal output in the process of the above-described Step 222, and the authenticity notification signal and the forgery notification signal may be stored in a storage area of the external device 30.

As described above, the authenticity determination device 10 according to the present exemplary embodiment stores the feature images of the plural different predetermined areas 40 (plural feature images) with, for example, the capacity of a storage area required to store one uncompressed feature image. Therefore, the authenticity of the sheet 28 is highly accurately determined, as compared with a case where the authenticity determination device 10 according to the present exemplary embodiment is not used.

Figure 12:
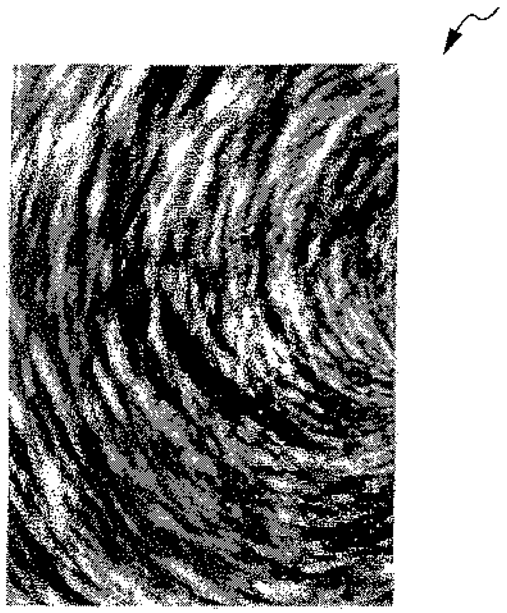
FIG. 12 is a diagram illustrating another example of the compression target image.

In the above-described exemplary embodiment, description has been made with reference to an example of embodiment which applies the two-dimensional coordinate system to the feature image in the two-dimensional FT or FFT. However, it is desirable to apply a polar coordinate system to, for example, an article having a surface including a continuous concentric pattern resembling annual rings of a tree, as illustrated in FIG. 12, an article having a surface including a continuous radial pattern, or an article having a surface including a spiral substantially streamline pattern. With this configuration, the presence or absence (or degree) of continuity is highly accurately determined, as compared with at least a case where the two-dimensional coordinate system is applied.

Further, in the above-described exemplary embodiment, description has been made with reference to an example of embodiment in which, on the assumption that the sheets 28 each serving as the target of authenticity determination are manufactured by a common manufacturing method and manufacturing line, each of the sheets 28 serving as the target of authenticity determination (sheet 28 for acquiring the sample data) and the sheet 28 used as the reference for determining the authenticity of the sheets 28 (sheet 28 for acquiring the master data) are regarded as different sheets, and in which a common sheet 28 is applied, as the sheet 28 serving as the reference for determining the authenticity, to the individual sheets 28 each serving as the target of authenticity determination. However, if the individual sheets 28 each serving as the target of authenticity determination are manufactured by manufacturing methods or manufacturing lines different from one another, the accuracy of the authenticity determination is more improved by the use of the sheet 28 for acquiring the sample data as the sheet 28 for acquiring the master data than the use of the common sheet 28 as the sheet 28 serving as the reference for determining the authenticity for each of the sheets 28 for acquiring the sample data, as described in the above-described exemplary embodiment. That is, each target of authenticity determination is handled as the sheet 28 serving as the reference. In this case, therefore, in the process of the above-described Step 118 of the flowchart illustrated in FIG. 4, the master data may be stored in the secondary memory 18 in association with identification information identifying the sheet 28 serving as the target from which the master data is extracted, and thereby the master data may be registered. Then, in the authenticity determination process program executed in the determination of authenticity of the sheet 28 serving as the determination target, a step of receiving information (identifier (ID)) corresponding to the identification information may be inserted before the above-described Step 200, and the corresponding master data may be read from the secondary memory 18 at the above-described Step 212 with the use of the information corresponding to the identification information received at the step preceding the above-described Step 200.

Further, in the above-described exemplary embodiment, the two-dimensional FT or FFT is applied to analyze the continuity of information in the feature image. The configuration, however, is not limited thereto, and wavelet analysis may be applied.

Further, in the above-described exemplary embodiment, description has been made with reference to an example of embodiment which identifies the direction of high continuity of information in the feature image by performing the two-dimensional FT or FFT. The configuration, however, is not limited thereto. If the continuity of information varies depending on the direction, and if the direction of high continuity is known in advance, the direction of high continuity may be specified in advance via the UI panel 20, and the information may be compressed in the direction, for example. In this case, information representing the compression direction (direction specified as the direction of high continuity) may previously be stored in the secondary memory 18, and the compression may be performed in the compression direction represented by the information.

Further, in the above-described exemplary embodiment, description has been made with reference to an example of embodiment which extracts the feature image from each of plural images obtained by the photographing of the plural predetermined areas 40, and performs the determination of authenticity by using the extracted feature image. The configuration, however, is not limited thereto. The feature image may be extracted from one image obtained by the photographing of one predetermined area 40, and the determination of authenticity may be performed with the use of the extracted feature image. In this case, the capacity of the storage area required to store the feature image is reduced, as compared with the above-described exemplary embodiment.

Further, in the above-described exemplary embodiment, the sheet 28 is transported in the X-axis direction and placed at the photographing position, to thereby include the predetermined area 40 serving as the photographing target in the photographing area of the camera 34. The configuration, however, is not limited thereto. The sheet 28 may be fixed without being transported, and the camera 34 may be moved in the X-axis direction, to thereby include the predetermined area 40 in the photographing area of the camera 34. Further, the sheet 28 and the camera 34 may be moved in mutually opposite directions along the X-axis direction, to thereby include the predetermined area 40 in the photographing area of the camera 34. As described above, at least one of the sheet 28 and the camera 34 may be relatively moved, to thereby include the predetermined area 40 in the photographing area of the camera 34.

Further, in the above-described exemplary embodiment, a software embodiment has been described as an example in which the CPU 12 executes the master data registration process program and the authenticity determination process program, to thereby achieve the processes of the respective steps of the master data registration process program and the authenticity determination process program. The configuration, however, is not limited thereto. The configuration may include a hardware embodiment formed by a variety of circuits (application specific integrated circuit (ASIC), for example) connected to one another and an embodiment combining a software embodiment and a hardware embodiment.

Further, in the above-described exemplary embodiment, description has been made with reference to an example of embodiment in which the master data registration process program and the authenticity determination process program are previously stored in the ROM 16. The configuration, however, is not limited thereto. An embodiment may be applied which provides the programs as stored in a computer readable recording medium, such as a compact disc (CD)-ROM, a digital versatile disc (DVD)-ROM, and a universal serial bus (USB) memory. Further, an embodiment may be applied which distributes the programs via a wired or wireless communication unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authenticity determination support device comprising:

an acquiring unit that photographs, in a solid having a unique random feature in a surface thereof, an area on the surface such that continuity of the unique random feature is generated in a first direction, and thereby acquires feature information representing the unique random feature included in the area; and a compressing unit that compresses the feature information in a direction in which continuity of the feature information acquired by the acquiring unit is high.

2. The authenticity determination support device according to claim 1, wherein the acquiring unit includes an irradiating unit that irradiates the area with light to form the shadow of the unique random feature and a photographing unit that photographs the area irradiated with light by the irradiating unit, and wherein the continuity of the feature information includes continuity of light and shade identified from an image obtained through the photographing by the photographing unit.

3. The authenticity determination support device according to claim 1, wherein the compressing unit includes a memory that stores continuity information representing the continuity in each of a plurality of directions of the feature information acquired by the acquiring unit, and wherein the compressing unit compresses the feature information in a direction in which the continuity represented by the continuity information stored in the memory is high.

4. The authenticity determination support device according to claim 3, wherein the compressing unit further includes an analyzing unit that performs frequency analysis on the feature information in each of the plurality of directions, and wherein the continuity information corresponds to the result of analysis by the analyzing unit.

5. The authenticity determination support device according to claim 1, wherein the position of the unique random feature in the area is specified by a two-dimensional coordinate system.

6. The authenticity determination support device according to claim 1, wherein the position of the unique random feature in the area is specified by a polar coordinate system.

7. The authenticity determination support device according to claim 1, further comprising:

a compression ratio memory that stores identification information identifying the solid and a compression ratio uniquely set for the solid, with the identification information and the compression ratio associated with each other; and a receiving unit that receives information corresponding to the identification information, wherein the compressing unit receives at the receiving unit the information corresponding to the identification information, acquires from the compression ratio memory the compression ratio associated with the identification information corresponding to the received information, and compresses the feature information serving as a compression target with the acquired compression ratio.

8. An authenticity determination device comprising the authenticity determination support device according to claim 1, wherein the acquiring unit acquires the feature information of a reference target solid serving as a reference for authenticity determination and the feature information of a determination target solid serving as a target of authenticity determination, wherein the compressing unit compresses, in the direction in which the continuity is high, the feature information of the reference target solid and the feature information of the determination target solid acquired by the acquiring unit, and wherein the authenticity determination device includes an output unit that outputs a signal indicating that the determination target solid is not a forgery, when the feature information of the determination target solid acquired by the acquiring unit and compressed by the compressing unit corresponds to the feature information of the reference target solid acquired by the acquiring unit and compressed by the compressing unit, and outputs a signal indicating that the determination target solid is a forgery, when the acquired and compressed feature information of the determination target solid does not correspond to the acquired and compressed feature information of the reference target solid.

9. A non-transitory computer readable medium storing a program causing a computer to execute a process for supporting authenticity determination, the process comprising:

photographing, in a solid having a unique random feature in a surface thereof, an area on the surface such that continuity of the unique random feature is generated in a first direction, and thereby acquiring feature information representing the unique random feature included in the area; and compressing the feature information in a direction in which continuity of the acquired feature information is high.

10. The non-transitory computer readable medium of claim 9, further storing a program causing a computer to execute an authenticity determination process, the authenticity determination process comprising:

acquiring feature information of a reference target solid serving as a reference for authenticity determination and feature information of a determination target solid serving as a target of authenticity determination;

compressing, in the direction in which the continuity is high, the acquired feature information of the reference target solid and the acquired feature information of the determination target solid; and outputting a signal indicating that the determination target solid is not a forgery, when the acquired and compressed feature information of the determination target solid corresponds to the acquired and compressed feature information of the reference target solid, and outputting a signal indicating that the determination target solid is a forgery, when the acquired and compressed feature information of the determination target solid does not correspond to the acquired and compressed feature information of the reference target solid.

11. The non-transitory computer readable medium of claim 9, wherein the compressing further comprises:

storing, in a memory, continuity information representing the continuity in each of a plurality of directions of the acquired feature information, and compressing the feature information in a direction in which the continuity represented by the stored continuity information is high.

12. An authenticity determination support method comprising:

photographing, in a solid having a unique random feature in a surface thereof, an area on the surface such that continuity of the unique random feature is generated in a first direction, and thereby acquiring feature information representing the unique random feature included in the area; and compressing the feature information in a direction in which continuity of the acquired feature information is high.

13. The authenticity determination support method of claim 12, wherein the compressing further comprises:

storing, in a memory, continuity information representing the continuity in each of a plurality of directions of the acquired feature information, and compressing the feature information in a direction in which the continuity represented by the stored continuity information is high.

* * * * *